United States Statutory Invention Registration [19]

[11] Reg. Number: H549

Lloyd [43] Published: Dec. 6, 1988

[54] APPARATUS AND METHOD FOR LOCATING TOWED SEISMIC APPARATUS

[75] Inventor: Joseph P. Lloyd, Houston, Tex.

[73] Assignee: Shell Oil Company, Houston, Tex.

[21] Appl. No.: 725,469

[22] Filed: Apr. 22, 1985

[51] Int. Cl.[4] ..... G01V 1/38
[52] U.S. Cl. ..... 367/19; 367/130
[58] Field of Search ..... 367/6, 19, 106, 119, 367/123, 125, 130; 364/449, 450, 456

[56] References Cited

U.S. PATENT DOCUMENTS

| | | | |
|---|---|---|---|
| 3,581,273 | 5/1971 | Heelferg | 367/19 |
| 3,745,518 | 7/1973 | Baret et al. | 367/6 |
| 3,905,007 | 9/1975 | Koesy | 367/6 |
| 3,947,803 | 3/1976 | Brown | 367/123 |
| 4,087,780 | 5/1978 | Itria et al. | 367/19 |
| 4,301,523 | 11/1981 | Meland et al. | 367/19 |
| 4,480,322 | 10/1984 | Oneux et al. | 367/123 |
| 4,532,617 | 7/1985 | Baecher et al. | 367/19 |
| 4,555,779 | 11/1985 | Roberts | 367/19 |

FOREIGN PATENT DOCUMENTS

| | | | |
|---|---|---|---|
| 0219726 | 8/1924 | United Kingdom | 367/19 |

OTHER PUBLICATIONS

Leroy et al, "Acoustic Measuring System . . . Performances", 5/8/74, pp. 849–863, OTC 2026, vol. 1.

Campbell, D. E., "Precise Acoustic Navigation . . . Keeping", 11/4/69, pp. 31–51, Conf. ION Nat. Marine Nav, 2nd Symp.

*Primary Examiner*—Stephen C. Buczinski
*Assistant Examiner*—Linda J. Wallace

[57] ABSTRACT

Apparatus and method are provided for locating seismic sources suspended below a float, seismic streamer cables and other towed seismic apparatus relative to a towing vessel. The range and bearing from a selectively energizable acoustic source on or near the float, cable or apparatus to the towing vessel is measured by an acoustic phased array.

8 Claims, 2 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

APPARATUS AND METHOD FOR LOCATING TOWED SEISMIC APPARATUS

BACKGROUND OF THE INVENTION

This invention relates to marine seismic exploration, and more particularly, relates to determining the positions of towed marine seismic sources, towed marine seismic detectors, and other towed marine apparatus.

In marine seismic exploration, various impulsive sources, which are typically air guns, may be suspended at some preselected depth beneath a float, or some other type of support apparatus. The float or apparatus is in turn towed by an exploration vessel; there may be a plurality of such floats or apparatus towed behind the exploration vessel. The exploration vessel may also tow a streamer cable, or another exploration vessel may tow the streamer cable. The streamer cable contains detectors to detect energy propagating upwardly from subsurface strata lying beneath the body of water in which the vessel operates.

The exploration vessel may determine its precise location in the body of water through the use of conventional navigation systems. Although such systems may be employed to determine the vessel's location, they generally do not determine the location of any source floats or apparatus, or streamer cable. Other onboard equipment must be employed to determine the location of the floats or apparatus, or streamer cable that may be in many different positions and at various distances depending upon the source and/or detector arrays employed.

Recently developed seismic prospecting techniques for so-called 3-D shooting, or for improving signal-to-noise ratios from subsurface layers, employ a plurality of seismic sources spaced from each other. These plurality of seismic sources may be deployed in either wide or long arrays. These wide or long source arrays require a plurality of floats or apparatus appropriately disposed in the water and towed by the exploration vessel.

The exploration vessel must determine the location of these plurality of sources and the streamer cable, as well as any other types of towed detectors, in order to accurately process any resulting detected signals. Further, it is important to know the location of such towed seismic apparatus during vessel turns to avoid damage to the apparatus. Thus, there is currently an unfulfilled need for simple onboard apparatus to locate towed seismic apparatus.

These and other limitations and disadvantages are overcome by the present invention, however, and methods and apparatus are provided for determining the positions of the towed seismic apparatus relative to the towing vessel.

SUMMARY OF THE INVENTION

In a preferred embodiment of the present invention, apparatus and methods are provided for determining the position of marine seismic sources, streamer cables and other types of towed detectors relative to the towing vessel. The method of the present invention determines the range and bearing angle from a phased array acoustic detector to preselected locations on or adjacent the source floats (or other supporting apparatus) and preselected locations on the streamer cable or other towed detectors; selectively activatable acoustic sources at these preselected locations provide the acoustic energy from which the phased array determines ranges and bearing angles. The apparatus of the present invention preferably employs a phased array acoustic detector and selectively activatable acoustic sources at known preselected locations on or near source floats or apparatus, streamer cables, and other towed detectors.

It is an object of the present invention to accurately measure the position of seismic sources, seismic detectors, and other towed detectors relative to their towing vessel.

These and other objects and advantages of the present invention will become apparent from the following detailed description, wherein reference is made to the Figures in the accompanying drawings.

DETAILED DESCRIPTION OF PREFERRED EMBODIMENTS

Figure 1:
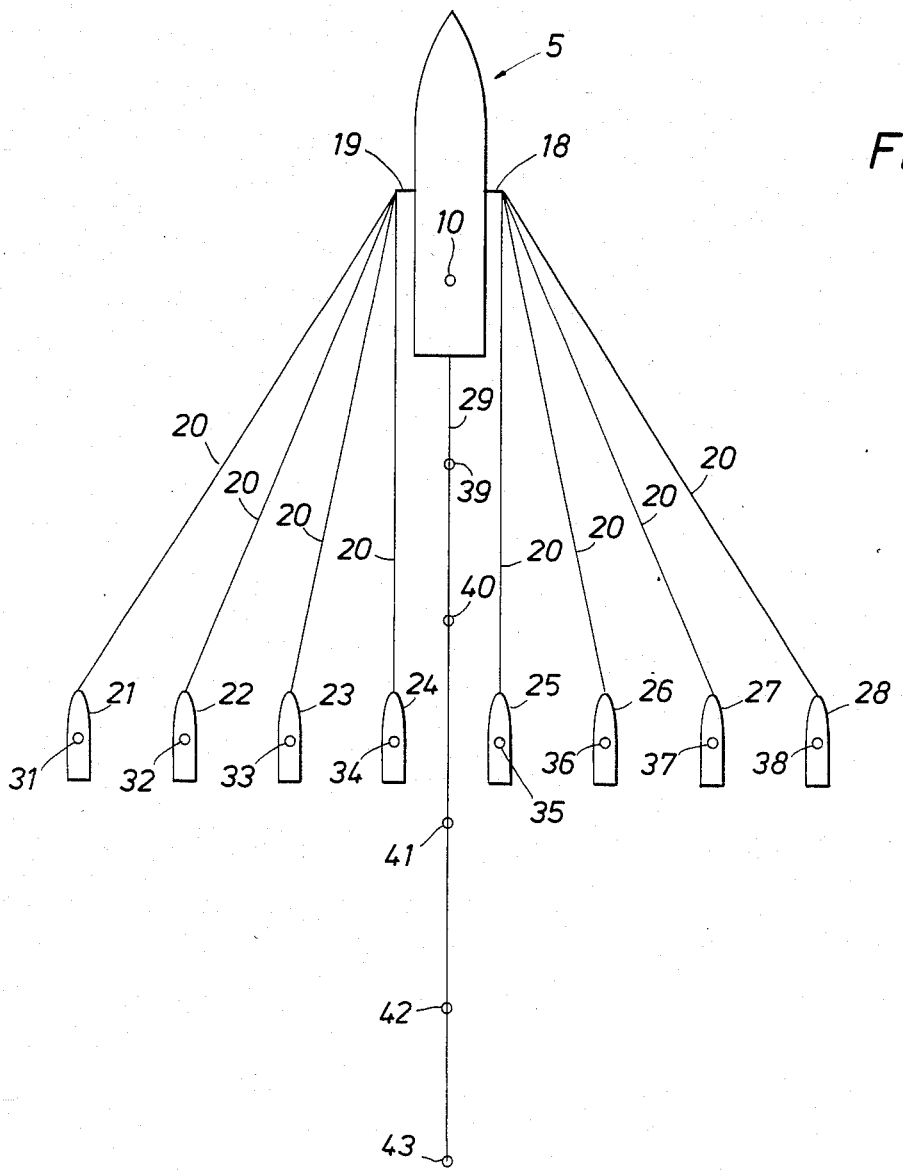
FIG. 1 is a plan view of a vessel towing marine seismic apparatus.

Referring now to FIG. 1, there may be seen a plan view of a vessel 5 towing a plurality of floats 21–28 and a streamer cable 29. Although floats 21–28 are depicted in FIG. 1, any other type of towable supporting apparatus capable of supporting the seismic sources at some predetermined depth are considered within the scope of the present invention; the term "float" or "floats" is used herein to mean any such type of towable supporting apparatus. More particularly, the exploration vessel 5 has mounted thereon an acoustic phased array assembly 10 (see FIG. 2), which may be extended below the hull of vessel 5 by conventional apparatus that is commercially available.

Vessel 5 also has appropriate towing gear 18 and 19 for towing floats 21–28 with cables 20. Further, vessel 5 is towing a marine seismic streamer cable 29 by means of appropriate towing gear (not shown). Although eight floats and one streamer cable are depicted in FIG. 1, these numbers are by way of illustration only and are not intended as any limitation on the scope of the invention.

Floats 21–28 may have suitable marine seismic sources disposed beneath them. Floats 21–28 may also have acoustic sources 31–38, respectively, located thereon, or adjacent the float and near the seismic source, in accordance with the concepts of the present invention. These acoustic sources 31–38 are preferably activated by signals sent over electrical wires from the vessel 5. This allows for simple and reliable apparatus to be located on or near the float where it is subjected to mechanical shocks each time the seismic sources are fired. These electrical wires are preferably in a wiring type harness that is attached to towing cable 20, although they may also be included in the towing cable 20.

Similarly, acoustic sources 39–43 are depicted at various known positions along the length of streamer cable 29. Such sources may be an integral part of the cable, or may be exteriorly mounted pods. The exteriorly mounted pods may be suitably activated by special signals sent down electric wires that are interior to the cable, as is well known in the art. Further, such acoustic sources may be located on other towed seismic detectors, such as, for example, but not limited to, deep tow source monitors or magnetometers.

Thus, all these various acoustic sources 31–43 are preferably selectively activatable, directly or indirectly, from vessel 5. Each source when appropriately activated emits a short acoustic signal. The sources may be transponders that are activated by the reception of an appropriate acoustic pulse or pulses, or preferably may be responders that are electrically activated, directly or indirectly, by a signal sent over a wire or pair of wires. The acoustic pulses to activate a transponder may also be transmitted by the acoustic phased array system 10. A portion of the acoustic sources 31–43 may be responders and the remainder transponders; for example, the float acoustic sources may be responders and the streamer cable acoustic sources may be transponders.

Also depicted in FIG. 1, is an acoustic phased array assembly 10. This phased array system is employed to determine a range and relative bearing of each of these sources when they are activated. Alternatively, this array assembly may also be used to transmit an appropriate acoustic pulse to a desired transponder. The phased array assembly operates in a manner well known in the art, but described briefly later herein.

Figure 2:
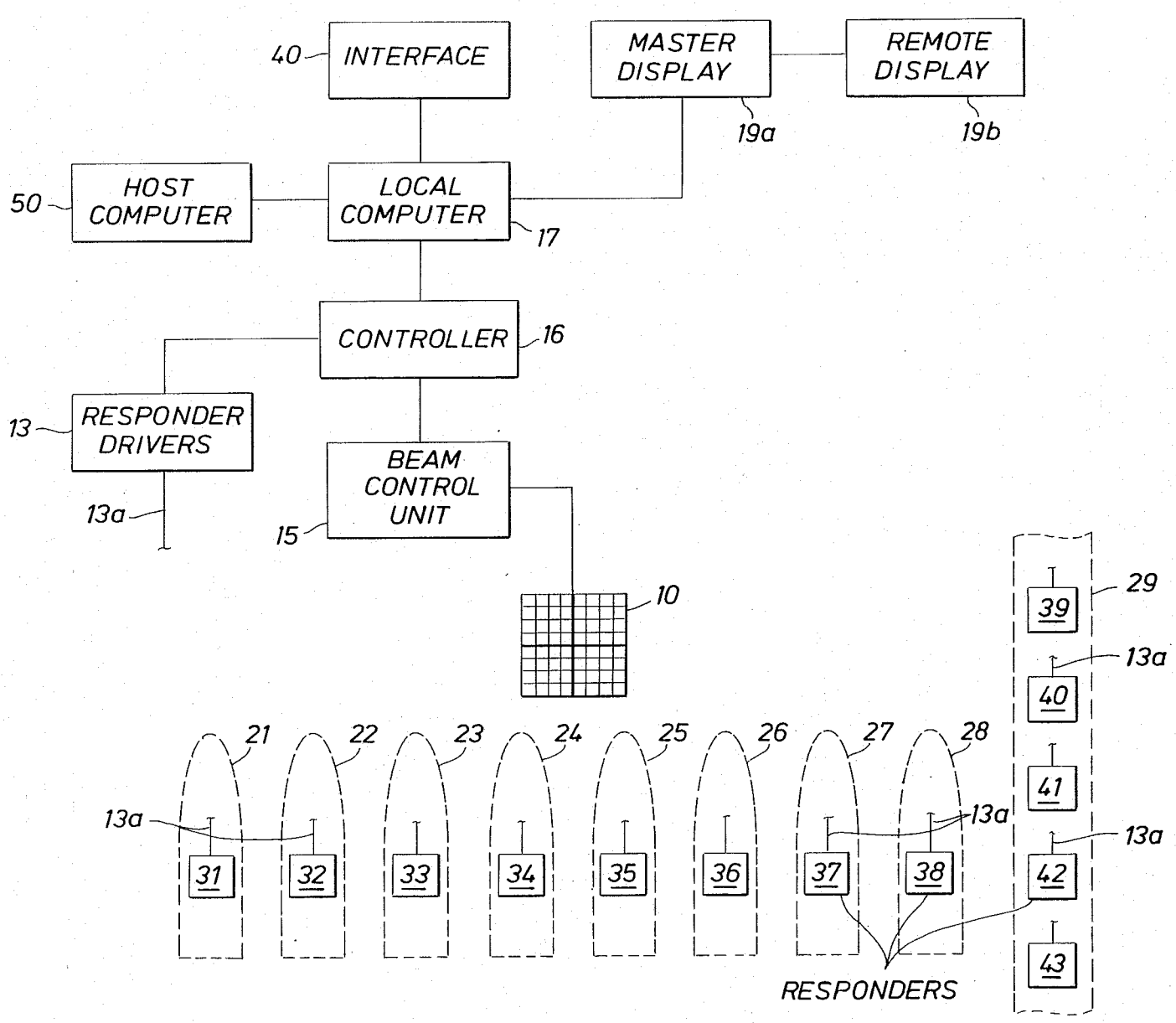
FIG. 2 is a simplified block diagram of one embodiment of the apparatus depicted in FIG. 1.

Referring now to FIG. 2, there may be seen a block diagram of a presently preferred embodiment of the apparatus of the present invention. More specifically, there may be seen the phased array assembly 10 which is interconnected with and operated by beam control unit 15. Controller 16 is interconnected with beam control unit 15 and responder drivers 13.

Thus, controller 16 selects the appropriate responder to be activated by selecting the appropriate responder driver 13. The responder driver 13 in turn sends an electric signal down a wire **13*a* to its corresponding responder. The float responders 31–38 may be and are preferably hardwired to their respective drivers 13, while the streamer cable responders 39–43 may be hardwired or electronically coupled to their respective drivers 13. The floats 21–28 and streamer cable 29 are depicted in shadow or outline form in FIG. 2**.

Continuing to refer to FIG. 2, there may also be seen a local computer 17 which has a master display **19*a* and remote display 19*b*. Alternatively, there may be more than one remote display 19*b*. Local computer 17** is appropriately programmed to monitor the location of the responders of source floats and streamer cable at some preselected frequency. The apparatus of the present invention is preferably designed to allow for the determination of the locations of all the operating float and streamer responders between seismic recording cycles, i.e. between successive firings of the seismic source, or sources.

Local computer 17 receives data on the course, speed, pitch, roll, etc. through an external interface unit 40. Local computer 17, in turn, provides in the appropriate format, the locations of the selected float and streamer responders, as well as vessel heading and time to host computer 50. Host computer 50 may store this information or use it for on-vessel seismic data processing or preprocessing, as is well known in the art.

Figure 3:
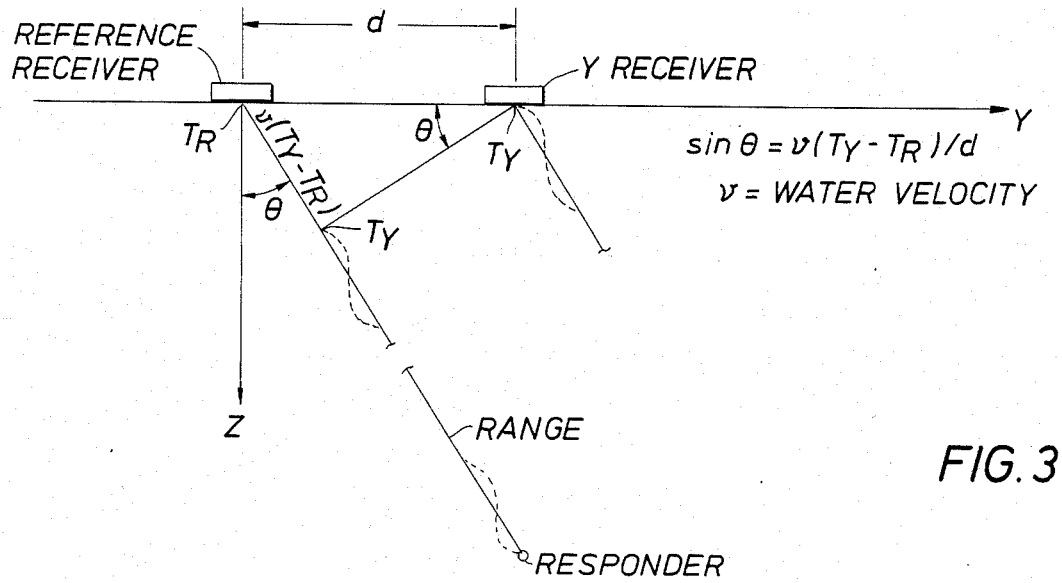
FIG. 3 is a simplified plan view of a portion of the apparatus depicted in FIG. 1.

Referring now to FIG. 3, there may be seen a simplified two-dimensional representation of how the phased array determines the range and bearing to a selected responder. This same basic principal is employed in three dimensions. The array circuitry determines the relative bearings from the differences in phase of an arriving acoustic signal at different closely spaced detectors, as is well known in the art. The range to the transponder is determined from the acoustic velocity (v) in the water of the area of interest and the time from the generation of the signal to a responder to transmit its acoustic pulse (reduced appropriately by any known equipment delay times) to the detection of arrival of the responder's signal by the phased array assembly. The acoustic velocity of the water of the area of interest is periodically determined by conventional techniques known in the art, such as, direct measurement of water velocity or measurement of temperature and salinity and then calculating the water velocity.

Thus, the method of the present invention determines a range and bearing to a preselected acoustic source or responder from a known location on the towing vessel. The preselected acoustic source or responder is in turn at a known location on or near a float for seismic sources or on a seismic streamer cable or other towed detector(s) and thereby determines the location of the float or cable area, or towed detector(s).

The presently preferred apparatus of the present invention employs an acoustic phased array detector assembly, beam control unit, controller, local computer, and master and remote displays, manufactured by SIMRAD, a Norwegian company.

The method and apparatus of the present invention require a direct acoustic path between the responder or transponder and the array detectors. If the floats are close to the towing vessel, the vessel's hull may block this acoustic path; for long seismic streamer cables the extremely distant responders or transponders may have no direct acoustic path when there are low acoustic velocities near the surface overlaying faster velocities below this low velocity layer, as acoustic rays bend towards the faster velocity layers.

Many other variations and modifications may be made in the apparatus and techniques hereinbefore described, by those having experience in this technology, without departing from the concepts of the present invention. Accordingly, it should be clearly understood that the apparatus and methods depicted in the accompanying drawings and referred to in the foregoing description are illustrative only and are not intended as limitations on the scope of the invention.

What is claimed is:

1. A method of locating a plurality of towed objects relative to a towing vessel, comprising:

selectively activating at least one of a plurality of acoustic sources corresponding to said plurality of towed objects and located at known positions adjacent said towed objects, acoustically determining an individual range and bearings to each of said selectively activated acoustic sources with a two-dimensional phased array located at one known position on said vessel, wherein said range is determined from the acoustic velocity of water adjacent said vessel and the travel time of acoustic energy from said selectively activated acoustic source to said phased array, and said bearings are determined from phase shifts detected by the elements of said phased array, and determining the positions of said towed objects relative to said vessel from said determined individual range and bearings and the known positions of said phased array on said vessel and said acoustic sources adjacent said towed objects.

2. Apparatus for locating a plurality of towed objects relative to a towing vessel, comprising:

means for selectively activating at least one of a plurality of acoustic sources corresponding to said plurality of towed objects and located at known positions adjacent said towed objects, means for acoustically determining an individual range and bearings to each of said selectively activated acoustic sources with a two-dimensional phased array located at one known position on said vessel, wherein said range is determined from the acoustic velocity of water adjacent said vessel and the travel time of acoustic energy from said selectively activated acoustic source to said phased array, and said bearings are determined from phase shifts detected by the elements of said phased array, and means for determining the positions of said towed objects relative to said vessel from said determined individual range and bearings and the known positions of said phased array on said vessel and said acoustic sources adjacent said towed objects.

3. Apparatus for locating a plurality of towed objects relative to a towing vessel, comprising:

separate acoustic source means adjacent and attached to each of said towed objects and each responsive to an individual preselected signal for generating an acoustic signal;

controller means for generating said preselected signals and for individually determining a range and bearing to said towed objects from a preselected location on said vessel; and a phased array located on said vessel at said preselected location for receiving said acoustic signals from said acoustic source means and interconnected with said controller means.

4. The apparatus of claim 3, further comprising:

display means for displaying said ranges and bearings.

5. The apparatus of claim 3, wherein said separate acoustic source means are responder means.

6. The apparatus of claim 5, wherein said responders are interconnected with said controller means.

7. The apparatus of claim 3, wherein said separate acoustic source means are transponders.

8. The apparatus of claim 3, wherein said separate acoustic source means comprises transponders and responders.

* * * * *